Dec. 3, 1940. C. I. LOTT 2,224,055
METAL WORKING MACHINE
Filed Jan. 12, 1938 2 Sheets-Sheet 2

Inventor
Charles I. Lott
By
Attorneys

Patented Dec. 3, 1940

2,224,055

UNITED STATES PATENT OFFICE 2,224,055

METAL WORKING MACHINE

Charles I. Lott, Du Bois, Pa.

Application January 12, 1938, Serial No. 184,664

2 Claims. (Cl. 51—105)

This invention relates to metal working machines and particularly to machines for forming bearing rollers or similar members from bar stock. More particularly, the invention is concerned with mechanism capable of use in grinding, drilling, polishing or cutting off bar stock smoothly and evenly to reduce grinding and machining operations to a minimum.

In cutting off sections of bar stock, a process to which the machine is especially applicable, the most usual practice has been to feed the bar stock step by step and to sever it by bringing non-rotating cutters into contact with rotating work. Such a method frequently results in cuts which are uneven or jagged with portions of burr left on the sections, particularly at the point where the cut ends. Such uneven cutting resulting from rupture of the metal fibers either at the center or at the periphery of the work increases the grinding or machining operations necessary to finish the work and otherwise increases the cost of production.

According to the present invention, it is proposed to rotate both the work and the cutter, so that the cut is made radially into the work and increases in depth gradually throughout the work circumference, thereby leaving the slight resulting burr of negligible amount at the center of the section which is cut off. It is also proposed to provide individual driving motors for each of the cutters and to mount both the motors and the cutters on a rotatable drum or housing which can be moved with reference to the rotating work.

The principles above set forth may be carried out most expeditiously and satisfactorily by the use of a machine combining the structure and operations of an automatic screw machine and a multiple spindle lathe. A plurality of spindles are provided to rotate and feed the work into operative relation with the rotating cutters, and the whole set-up is designed and correlated to speed up production to a maximum degree.

The main object of the invention is, therefore, to increase the rate of production of articles which are to be cut from bar stock and to reduce machining and grinding operations by employing a mechanism in which both the cutters and the work are rotated. Furthermore, the object is to mount the driving motors on a rotatable carrier in such a way that the motors are direct-connected to the cutters and the use of gearing or belting is avoided entirely.

A further object is to produce a machine in which cutting operations may be performed simultaneously on a large number of bars of stock or upon a smaller number as circumstances may require, and in which use may be made of the highly efficient abrasives at present available for cutting smooth surfaces with a minimum of burr, and in which the abrasive is carried in a rubber mounting.

Other objects and advantages will be apparent from a reading of the following specification in connection with the accompanying drawings, in which:

Fig. 3 is a detail sectional view of one form of work spindle suitable for use in machines of the type to which the present invention relates.

Figure 1:
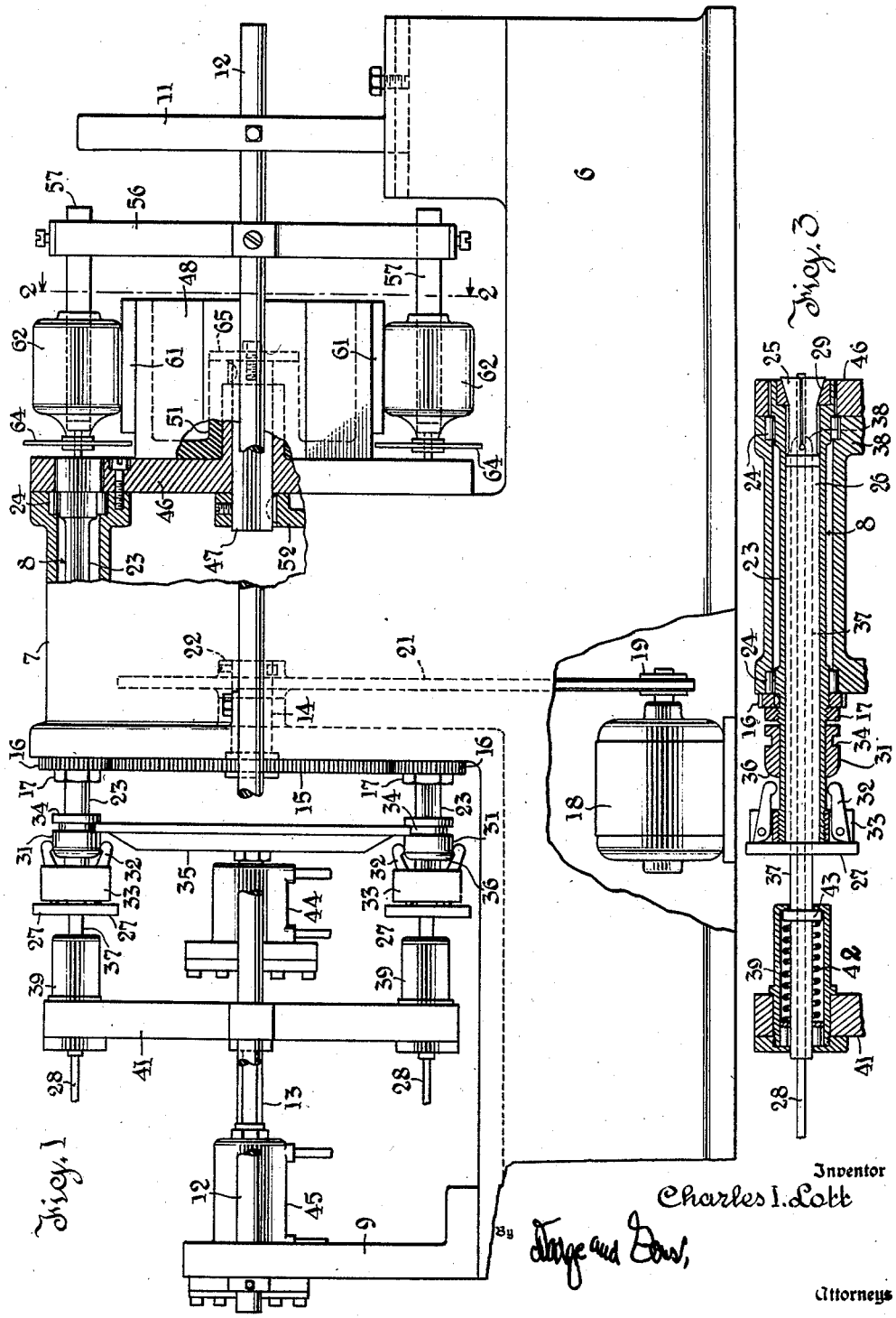
Figure 1 is a side view, partly in section, of one form of metal working machine embodying the present invention.

In the drawings, the reference character 6 designates the base of the machine, preferably hollow and formed to house the driving mechanism for the spindles and for the tools. This base, as shown, carries substantially midway between its ends a head-stock housing 7, within which are mounted a plurality of spindles 8 of the type ordinarily employed in conventional automatic screw machines.

Upstanding from the rear of the machine is an extension 9 which cooperates with an adjustable forward extension 11, to carry two parallel supporting or guide bars 12 and 13 extending throughout the length of the machine and adapted to guide certain of the operating parts.

Located within the head-stock housing 7 is a suitably journaled shaft 14 carrying a central driving gear 15 which meshes with a plurality of pinions 16, one associated with each of the spindles 8 and held in the housing 7 by nuts 17. The gear 15 may be driven in any suitable manner, but as here shown the drive comprises a motor 18 mounted within the base 6 and connected in driving relation with the shaft 14 by a sprocket chain 21 cooperating with sprocket wheels 19 and 22 carried on the motor and the shaft 14, respectively. When the gear 15 is driven, the spindles 8 are all driven at high speed, as a result of the multiplying action of gear 15 and the associated pinions, and rotate in their bearings 24.

The spindles 8 carried in the head-stock 7 are for the most part of standard construction, including the usual collet, feed tube, feed finger, and locking spool with associated mechanism for operating the collet. In addition, however, there is provided a spring cushioning means so that when the stock is fed forward against a stop, the jarring incident to such feeding action is absorbed by a coil spring. Inasmuch as all of the spindles 8 are of similar construction, a detailed description of one will be sufficient for a complete understanding of the invention.

Fig. 3 of the drawings shows in detail the construction of one of these spindles, and, when this view is studied in connection with Fig. 1, the showing is complete. Each spindle comprises a tubular member 23 mounted within the head 7 and rotatable in bearings 24, one at either end of the head. The pinion 16 is keyed to this tube, and the tube, as well as the gear, is held in position by the lock nut 17. This arrangement prevents the tube 23 from being moved axially in either direction with respect to this head, except for the limited play permitted by the roller bearings.

Mounted within the tube 23 and carrying at its forward end the usual collet 25, is a tube 26. This tube has secured to it at its rear end a stop plate 27 which may operate the collet 25 to bring it into locking engagement with the stock 28 when the plate 27 is moved rearwardly. The locking of the jaws of the collet is brought about by inclined cam surfaces 29 on the inside of tube 23, as shown. Actuation of the tube 26 is accomplished through a mechanism including a locking spool 31 which is slidable on the tube 23 into or out of engagement with pivoted locking fingers 32 carried in a support 33 rigidly attached to the tube 23. Each of the locking spools 31 is grooved at 34 for engagement with the bead of an actuating spider 35 and has an inclined cam surface 36 at one end for cooperation with the fingers 32.

From the above it will be clear that, when a locking spool 31 is moved into engagement with the locking fingers 32, the fingers will be pivoted about their supports and will move the plate 27 to the left, thereby closing the jaws of collet 25 upon the stock 28. When the locking spool is moved to the right out of engagement with the fingers 32, these fingers are released and the plate 27, together with tube 23, moved to the right through the resilience of the collet jaws carrying the collet faces along the inclined surfaces 29 to release the stock.

The structure so far described is of more or less standard construction. Likewise, the feed tube 37 having a feed finger 38 secured to its forward end is of standard construction. As shown, this tube 37 passes through a housing 39 carried in the disc 41 with respect to which it is rotatable. Surrounding the tube 37 inside of housing 39 is a coiled cushion spring 42 which reacts against a collar 43 keyed to the tube 37 just inside of the forward end of housing 39. Consequently when the tube 37 is moved to the left, the collar 43 presses against the spring 42 and compresses it. Motion of the tube 37 to the right is limited by engagement of collar 43 and the right hand end of housing 39. Should the stock 28 be fed too far, the reaction exerted on tube 37 carrying the feed finger 38, will cause a compression of spring 42, thereby reducing the shock on the mechanism and tending to avoid any distortion of the stock by bringing it into too violent engagement with its stop.

While the stock feeding and clamping mechanism may be actuated in any conventional manner, the means for producing such feeding and clamping is shown herein as two hydraulic cylinders 44 and 45. The cylinder 44 actuates the spider 35 in order to move the locking spools 31 to release or clamp the stock. The cylinder 45 operates to feed the disc 41 forward or backward in order to feed stock through the collet when such collet is released through the spider 35 and its actuating cylinder 44.

As shown in the drawings (Fig. 1), the parts occupy the position which they would have with the stock fed forward against the stops and in position for the cutting tools to operate. When the cutting tools have operated and it is time for stock to be fed forwardly again, the hydraulic cylinder 44 is supplied with pressure so as to move the spider 35 to the right in Fig. 1, thereby moving the locking spools 31 forwardly and permitting all of the collets 25 to release the stock therein. The cylinder 45 is then supplied with pressure to move the disc 41 to the right into the position shown to thereby move the feed tubes 37, together with the stock held by the feed fingers, through the collets and against the stops. When the stock strikes the stops, as shown in Fig. 1 the collets are again closed before the cutting tools operate. During this feeding action, the cushioning springs 42 will operate to prevent damage to the mechanism or the stock, during the feeding operation, or immediately subsequent thereto.

The forward end 46 of the head-stock is apertured to receive a stub shaft 47 for mounting the drum 48. This drum is keyed to the stub shaft 47 and comprises a member polygonal in cross section, closed at the inner end and having in its periphery a plurality of longitudinal slots or grooves 49, in which the tool driving motors and the tools are mounted. This drum has flat faces on its periphery and a hollow central stud 51 upstanding therein and cooperating with the stub shaft 47 and cap 65.

Figure 2:
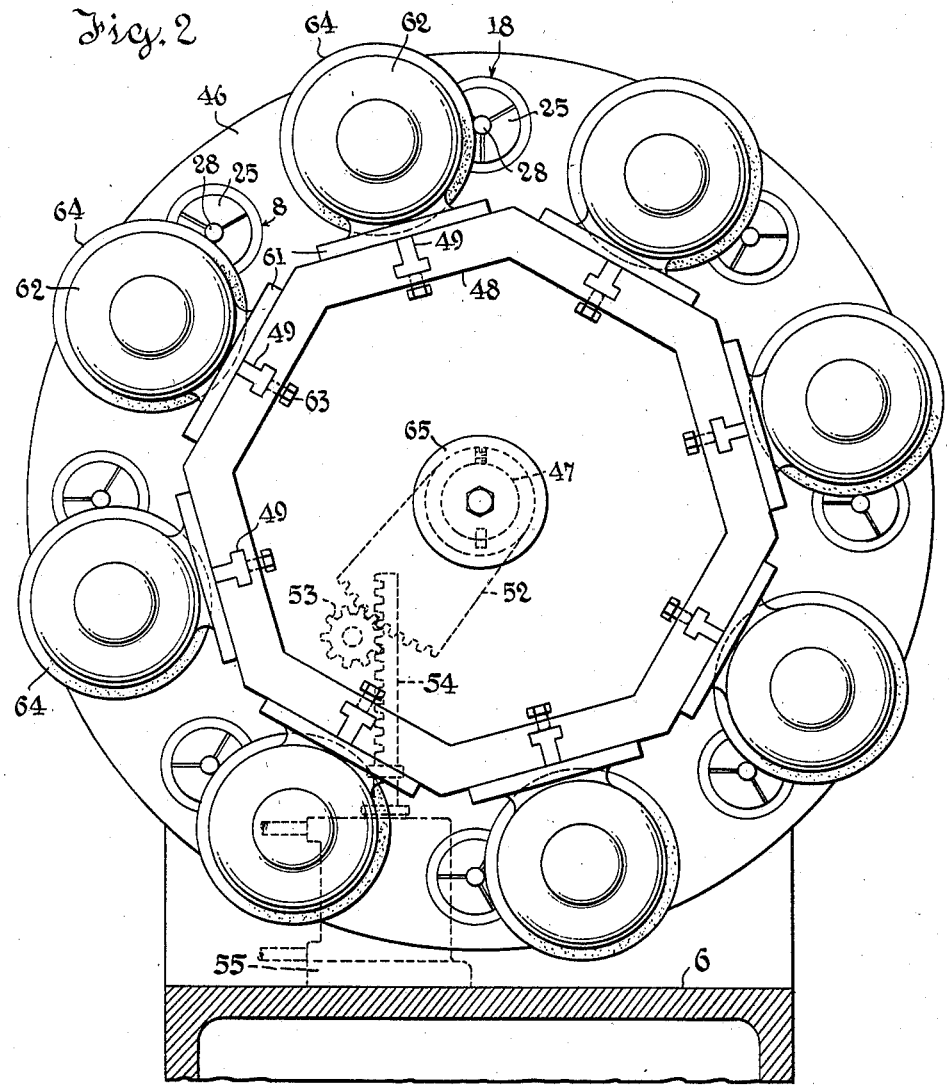
Fig. 2 is a sectional view taken approximately on the line 2—2 of Fig. 1.

The tool drum 48 may be subjected to slight rotatable movement in order to bring the tools or cutters carried thereby, into operative relation with the work carried by the spindles. For the purpose of actuating this drum, the stub shaft 47 carries an arm 52 having a gear sector at its free end meshing with a pinion 53 which, in turn, is driven by rack 54 adapted to be actuated by an hydraulic cylinder 55 mounted on the base of the machine as best illustrated in Fig. 2.

Adjustably mounted on the bars 12 and 13 is a stop carrying plate or member 56 having a plurality of stops 57 carried therein, and arranged for cooperation with the several work holding spindles. The stops 57 are so located that they do not interfere with the rotational movement of the cutter units carried by the tool drum 48. The stop carrying member 56 may be removed from the machine if bracket 11 is taken off, and various arrangements of stops may be substituted if desired. The stops may also be removed individually without disturbing the location of member 56.

The grooves 49 in the periphery of the drum are of inverted T-shape in cross section, to receive T-shaped extensions carried by the bases 61 of the motors 62. Cooperating with the grooves and T-shaped extensions are locking means such as set screws 63 provided to hold the various cutting or grinding units in fixed position on the tool drum. Mounted on the shaft of each of the motors 62 is a tool 64, here shown as consisting of a cutting disc preferably made up of a fine cutting abrasive set in a rubber mounting. Cutting wheels of this type are very efficient in operation and result in a smoothly cut surface on the work, since it is possible by the use of this mounting to employ smaller sized abrasive grains and to hold them securely in position where other mounting means would be ineffective. It is to be understood that while discs are shown associated with the motor 62 for the purpose of severing the bar stock fed from the spindles, the invention is not limited to the use of such cutting wheels or discs, it being readily possible to use other abrasive means for operating on the work and to employ any other form of rotating tool which may be direct-connected to the motors. These tools may, for example, take the form of drills, saws, or polishing wheels, and no limitations, other than those distinctly stated, are to be implied.

The operation of the tools on the tool drum will be understood readily from the description which has already been given, and it will be clear that when discs of the type described are used for severing the bars of stock, the tool drum 48 need only be displaced through a distance equal to one-half of the thickness of the stock to be severed, since both the work and the severing tools are rotating. Inasmuch as the amount of displacement of the tool drum is slight, it is possible to locate the actuating rack 54 between two neighboring work spindles without in any way interfering with the feeding movement of the tool drum or the parts carried thereby. It will be clear that while the head-stock 7 is shown with a plurality of work feeding spindles, each spindle having a tool unit operatively associated with it, one only of these units may be employed at a time or any number greater than one including the total number carried by the head-stock and the tool drum. Inasmuch as a considerable number of bars of stock may be fed forward simultaneously and also severed, or otherwise worked upon simultaneously, the rate of production of articles such as bearing rollers is very high and proceeds without interruption so long as fresh bars of stock are fed through the work spindles. While the drawing illustrates all of the tool units as being of the same character, it is obvious that different types of tool may be disposed at different stages and all of them may operate simultaneously on different bars of stock, so long as the feeding movements are compatible with one another.

Although only one form of metal working machine has been disclosed herein, it is obvious that this disclosure is merely by way of illustration, as numerous changes and modifications may be made in the details within the scope of the appended claims without departing from the spirit and scope of the invention.

What is claimed is:

1. A metal working machine comprising a bed having head-stock thereon; a plurality of work supporting spindles mounted in said head-stock; means for rotating said spindles and the bar stock carried thereby; means for feeding the bar stock through said spindles; a cutter supporting drum mounted for rotational movement with respect to said head-stock, and substantially concentric with said head-stock; a plurality of motor units adjustably mounted on said head-stock and each having a rotating cutter carried on its shaft; and means for subjecting said drum to limited rotational movement to bring said rotating cutters into cutting relation with the rotating bars of stock projecting from said spindles.

2. In a metal working machine of the type comprising a head-stock having a plurality of rotatable work supporting spindles through which stock is fed intermittently; a cutting tool carrier rotatably mounted in coaxial relation with said head-stock, said carrier comprising a drum-like member of polygonal cross section having flat faces on its periphery; a motor base on each said faces and axially adjustable thereon; a plurality of rotatable cutting discs each comprising a body of rubber having abrasive grains embedded therein and characterized by its ability to cut metal without the formation of burr, one of said discs being mounted on the shaft of each motor and arranged to cooperate with work pieces carried by said spindles; common means for driving all of said spindles; means for subjecting said drum to limited rotational movement to bring all the cutting discs into or out of engagement with their cooperating work pieces at one time; and means permitting removal of said drum and the parts carried thereby as a unit.

CHARLES I. LOTT.